UNITED STATES PATENT OFFICE.

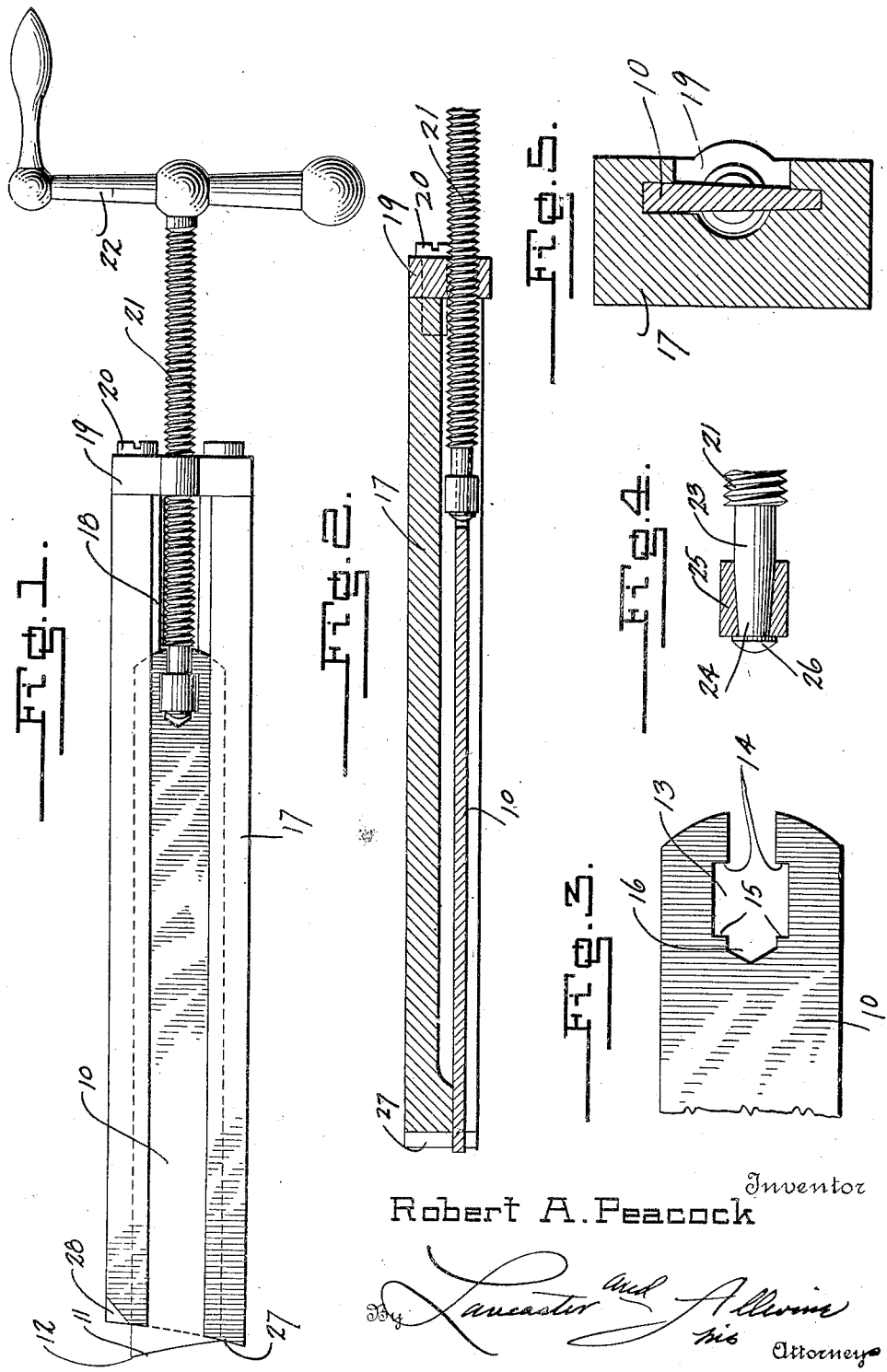

ROBERT A. PEACOCK, OF DELAWARE CITY, DELAWARE.

CUTTING-OFF TOOL.

1,374,226.  Specification of Letters Patent.  Patented Apr. 12, 1921.

Application filed May 17, 1920. Serial No. 382,164.

*To all whom it may concern:*

Be it known that I, ROBERT A. PEACOCK, a citizen of the United States, residing at Delaware City, in the county of New Castle and State of Delaware, have invented certain new and useful Improvements in Cutting-Off Tools, of which the following is a specification.

The present invention relates to engine-lathe attachments, and more particularly to a holder for cutting-off tools.

An object of the present invention is to provide a holder of this character which may be mounted in the usual tool post or other support provided for maintaining the usual cutting-off tool in position, which may be adjusted in the manner of adjusting such tools; which constitutes a brace for supporting the cutting tool and for reducing vibration thereof incident to the cutting action; and which embodies means for advancing the cutter in the holder so that fine adjustments may be made during the use of the cutter.

Another object of the present invention is to provide a tool holder of this character which is of relatively simple construction, which is compact in form; which permits the quick and easy removal and replacement of the cutter; and which may be economically manufactured.

The above, and various other objects and advantages of this invention will in part be described in, and in part be understood from, the following detailed description of the present preferred embodiment, the same being illustrated in the accompanying drawing, wherein;

Figure 1 is a side elevation of a tool holder constructed according to the present invention and having a cutter mounted therein.

Fig. 2 is a horizontal section taken through the holder with the cutter therein on a plane substantially midway between the upper and lower edges of the holder.

Fig. 3 is a fragmentary enlarged view of the inner end of the cutter, showing the socket formed therein.

Fig. 4 is a fragmentary sectional view enlarged of the head end of the adjusting screw for fitting in the socket of the cutter, and Fig. 5 is an enlarged transverse section taken through the holder with the cutter mounted therein.

Referring to this drawing, wherein like parts are designated by similar characters of reference throughout the several views, 10 designates a cutter bar which is of the usual type, and known to the trade as the Armstrong cutter.

This cutter bar 10 is provided at its outer end with a diagonally cut edge 11 which is given a desired configuration and which extends from edge to edge of the cutter forming a cutting point 12 at one edge which projects longitudinally beyond the other edge of the cutter bar.

As best shown in Fig. 3 the inner end of the cutter bar 10 is provided with a socket 13 which may be formed by stamping or machining and which opens through the rear end of the cutter bar forming thereat inwardly facing shoulders 14. Opposed to the shoulders 14 are shoulders 15 formed in the forward end of the socket 13 and the shoulders 14 and 15 are adapted to take up the endwise thrust imposed upon the cutter blade 10 by the feed screw, which will be later described. Between the shoulders 15 the cutter bar 10 is provided with a depression 16 to accommodate the forward end of the feed screw.

The body of the holder comprises a metallic block 17 of suitable length, thickness, and width, and which has in one lateral face an undercut substantially dove-tailed socket or groove 18 extending throughout the length of the holder 17 and shaped in cross sectional configuration to the transverse contour of the cutter bar 10 for snugly receiving the same, as best illustrated in Fig. 5. It will be noted that the upper edge portion of the cutter bar 10 is of greater thickness than the lower edge portion thereof, and that the slot 18 is correspondingly shaped so as to offset any vibration or loose play of the cutter bar in the holder. This increased thickness at the upper edge of the cutter bar is for the purpose of strengthening and reinforcing the cutter point 12 which receives impact from the work during use.

Fitted to the rear end of the body 17 is a cap piece 19 secured detachably to the body by screws 20 of any approved form, or any other suitable fastening means. The cap 19 has a screw-threaded opening formed therethrough coaxially with the undercut slot 18 and through which is threaded a relatively long feed screw 21 equipped on its outer end with a crank handle 22 and adapted at its inner end for interlocking engagement with the cutter bar 10.

As best shown in Fig. 4, the feed screw 21 is provided with a reduced shank 23 of a size adapted to fit snugly in the opening in the rear end of the cutter bar 10, and the shank 23 is adapted to project into the socket 13 between the shoulders 14. The outer end portion 24 of the shank is tapered or is given substantial frusto-conical formation to receive in binding engagement thereover a head piece or block 25 which is preferably of exterior cylindrical contour and is of a length and diameter adapted to closely fit the walls and shoulders of the recess 13. This head piece or block is adapted to interlock the feed screw 21 to the cutter bar 10 and to form with the cutter bar a swivel joint. The forward end of the head 25 is adapted to bear against the forward shoulders 15, while the rear end of the head 25 is adapted to engage the shoulders 14.

The head 25 is riveted upon the conical portion 24 of the shank by means of the swaged or upset portion 26 of the shank which is turned over against the outer end of the head. The advantage of the conical mounting of the head is that forward thrust of the feed screw, which is the greatest strain or thrust on the parts, tends to bind the head 25 more firmly upon the stem. The forward end of the holder 17 is provided with a concavity 27 extending from edge to edge of the holder, and the upper edge of the holder is preferably notched, as at 28 in registry with the upper edge of the bar 10 for permitting the free passage of chips which are projected from the work by the cutting point 12.

The operation of the device is apparent, for when the holder 17 is used, it is mounted on the tool post in the ordinary manner and may be set up in close proximity to the work. The feed screw 21 may be turned to advance the cutter bar 10 against the work and as the holder 17 approaches in close proximity to the work it supports the cutter bar 10 and holds the latter from vibrating. In this manner the undue yielding of the cutter bar is prevented with the result that there is less likelihood of injuring the cutting tool, the work is more uniform, and a finer adjustment may be made in the use of the tool.

The cutter bar 10 may be quickly removed and replaced by removal of the head 19 which, when disengaged from the body 17 permits the longitudinal withdrawal of the cutter 10 through the rear end of the body 17. As soon as the screw feed, and cutter have been sufficiently withdrawn to free the head 19 from the body 17 the head 25 of the screw feed may be lifted laterally out of the socket 13 to separate the parts.

It is, of course, understood that various changes and modifications may be made in the details of construction and design of the above specifically described embodiment of this invention without departing from the spirit thereof, such changes and modifications being restricted only by the following claims.

What is claimed is:

1. In a tool holder, the combination with a cutter bar provided with a forward cutting edge and a socket in its inner end, a body portion of greater length than the cutter bar and provided in one side with an undercut slot adapted to receive said cutter bar, a head mounted on the inner end of said body portion, a feed screw threaded through the head and projecting into said slot, and a swivel connection between the feed screw and said cutter bar and arranged detachably in said socket for moving the cutter bar in said body portion.

2. In a tool holder, the combination of a flat cutter bar, a body portion having an undercut slot in one side adapted to receive the cutter bar therein, a head on the inner end of the body portion, a feed screw threaded through said head coaxially with the undercut slot, and a connection between the cutter bar and the feed screw whereby operation of the feed screw is adapted to shift said cutter bar longitudinally in the slot for projecting the cutter bar from the forward end of the body portion.

3. In a tool holder, the combination of a flat cutter bar having a forward cutting edge and provided with a socket in its inner end opening through the rear extremity of the cutter bar, a body portion having an undercut slot formed in one side adapted to receive the cutter bar therein, a head detachably mounted on the rear end of the body portion, a feed screw threaded through the head coaxially with the undercut slot, and a block mounted upon the forward end of the feed screw adapted to fit in the socket of the cutter bar whereby operation of the feed screw is adapted to move said block against the walls of the socket for advancing and retracting the cutter bar during adjustment thereof in the body portion.

4. In a tool holder, the combination of a body portion adapted to be mounted on a lathe and having an outer concave end adapted to be arranged in proximity to the work and equipped in one side with an undercut slot extending from end to end of the body portion and opening through said ends, a cutter bar slidably mounted in the slot having a cutting edge adapted to project through the forward end of the cutter bar for contact with the work, a cap piece on the rear end of the body portion, a feed screw carried by the cap piece coaxially with said slot, and a swivel connection between the feed screw and the rear end of the cutter bar, whereby operation of the feed screw is adapted to advance said cutter bar from the forward end of the body portion into contact with the work.

5. In a tool holder, the combination of a body portion provided with an undercut slot in one side extending throughout the length of the body portion, a cutter bar fitted in the slot to move longitudinally in the body portion, a feed screw mounted in the inner end of the body portion and provided at its forward end with a tapering shank, a cylindrical head having a coaxially tapering bore adapted to fit said shank, said shank being riveted at its outer end to maintain the head on the shank, said cutter bar having a socket formed therein near its inner end and provided with an opening extending from the socket through said inner end, said head being adapted to fit in said socket and said shank being adapted to project through the opening leading from the socket whereby said head is engaged at opposite ends with the front and rear walls of the socket, and means for turning said feed screw.

ROBERT A. PEACOCK.